B. D. MILLER.
MILK-COOLER.

No. 189,485. Patented April 10, 1877.

Witnesses:
Lewis F. Brous
A. P. Grant.

Inventor:
B. Davis Miller,
by John A. Wiedersheim
Attorney.

UNITED STATES PATENT OFFICE.

B. DAVIS MILLER, OF VINCENT, PENNSYLVANIA.

IMPROVEMENT IN MILK-COOLERS.

Specification forming part of Letters Patent No. 189,485, dated April 10, 1877; application filed January 26, 1877.

*To all whom it may concern:*

Be it known that I, B. DAVIS MILLER, of Vincent, in the county of Chester and State of Pennsylvania, have invented a new and useful Improvement in Milk-Coolers, which improvement is fully set forth in the following specification and accompanying drawing, in which—

Figure 1:
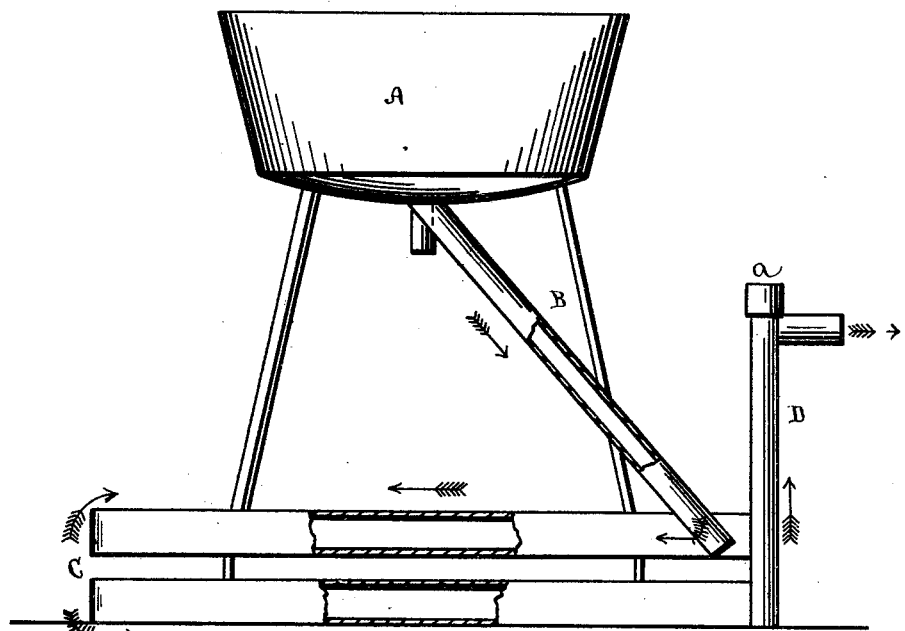
Figure 2:
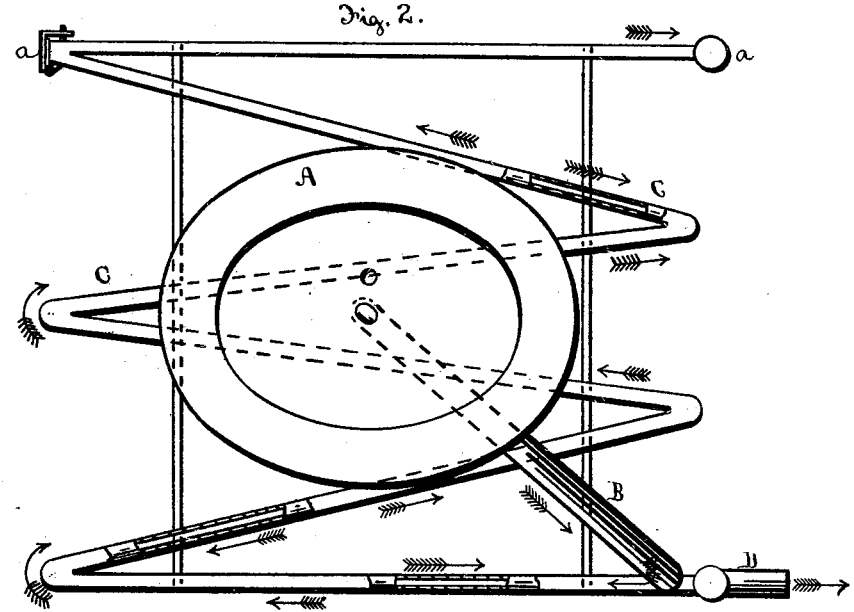
Figure 3:
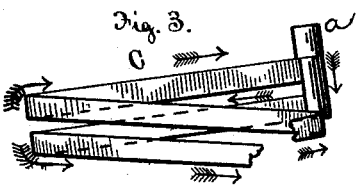

Figure 1 is a side elevation, partly sectional, of the cooler embodying my invention. Fig. 2 is a top view thereof. Fig. 3 is a perspective view of a portion thereof.

Similar letters of reference indicate corresponding parts in the several figures.

My invention consists of a receiving-pan supported on and communicating with a base consisting of tubes extending in zigzag order, whereby, when said base is properly submerged in water or other cooling fluid, the milk, in flowing from the pan through the base to a place of collection, will be subjected to a large cooling-surface, and thus quickly deprived of its warmth.

Referring to the drawings, A represents a pan for receiving the milk to be cooled. B represents a pipe, communicating with the bottom of the pan, and extending downwardly to and communicating with a base, C, which consists of a horizontally-arranged pipe extending in zigzag order, and having at the termination thereof an outlet pipe or branch, D. The pan A is secured to the base C, and supported thereon at an elevation above the mouth of the outlet-pipe D.

The base will be submerged in water or other cooling medium, the height thereof being below the mouth of the pipe D. The milk is now poured into the pan A, and it flows through the pipe B into the zigzag-arranged pipe or base C, whereby it is subjected to the cooling action thereof, and it then passes out cooled through the outlet-pipe D.

The base C is double or made of two or more horizontally-arranged zigzag pipes, one above the other, so that when the milk has passed through one pipe from the descending pipe B to the opposite side, it will return through the other pipe on its passage to the outlet D, thus increasing the cooling-surface of the base.

It will also be seen that the device may rest on the base C as a support, and that it is readily portable.

If desired, the base-pipe may have a water-jacket secured to it, in which case the termination of said pipe may project through the wall of said jacket without regard to altitude.

Provision is made for cleansing the various parts and affording access thereto by means of caps, plugs, or doors *a*.

It will also be seen that, as the device is portable, it is not essential to provide stopcocks or outlets on the lower line of the double zigzag pipe in order to remove the milk that remains in said pipe after the flow ceases, as such operation may be accomplished by removing the device from the water, and then properly canting it in various directions in order to direct said milk to the pipe D.

Having thus described my invention, what I claim as new, and desire to secure by Letters Patent, is—

The pan A, in combination with the tubular base C, consisting of the double zigzag pipe, and with the upwardly-projecting pipe D, substantially as and for the purpose set forth.

B. DAVIS MILLER.

Witnesses:
 JOHN A. WIEDERSHEIM,
 JNO. A. BELL.